United States Patent [19]

Penny

[11] 4,274,498

[45] Jun. 23, 1981

[54] ROCK BIT LUBRICATION SYSTEM UTILIZING EXPELLABLE PLUG FOR OBTAINING EXPANSION SPACE

[75] Inventor: Samuel L. Penny, Lancaster, Tex.

[73] Assignee: Dresser Industries, Inc., Dallas, Tex.

[21] Appl. No.: 36,472

[22] Filed: May 7, 1979

Related U.S. Application Data

[63] Continuation-in-part of Ser. No. 812,287, Jul. 1, 1977.

[51] Int. Cl.³ .................................................. E21B 10/24
[52] U.S. Cl. ..................................... 175/228; 175/374
[58] Field of Search ......................... 175/39, 227–229, 175/59; 166/164, 264

[56] References Cited

U.S. PATENT DOCUMENTS

| | | | |
|---|---|---|---|
| 3,022,826 | 2/1962 | Kisling | 166/164 X |
| 3,230,020 | 1/1966 | Gilbert et al. | 175/228 |
| 3,476,195 | 11/1969 | Galle | 175/228 |
| 3,487,890 | 1/1970 | Martinsen | 175/228 X |
| 3,719,241 | 3/1973 | Bell | 175/228 |
| 3,847,234 | 11/1974 | Schumacker | 175/228 |
| 3,917,028 | 11/1975 | Garner | 175/228 X |
| 4,014,595 | 3/1977 | Dolzal | 175/228 X |

*Primary Examiner*—William F. Pate, III
*Attorney, Agent, or Firm*—Eddie E. Scott; Fred A. Winans

[57] ABSTRACT

A rotary rock bit is constructed with a lubrication system having an expansion space provided within the lubrication system to accommodate increases in internal volume during drilling. A flexible diaphragm is located in the lubricant reservoir cavity in the bit dividing the cavity into a lubricant portion and an expansion portion. A low melting point wax plug is positioned in the expansion portion of the lubricant reservoir. The lubricant portion of the lubricant reservoir is filled with lubricant. The wax plug prevents lubricant from entering the expansion portion. The bit is heated above the melting temperature of the wax plug allowing the wax to melt and run out of the bit. This provides an expansion space in the bit to accommodate an increase in volume in the lubrication system during drilling.

4 Claims, 3 Drawing Figures

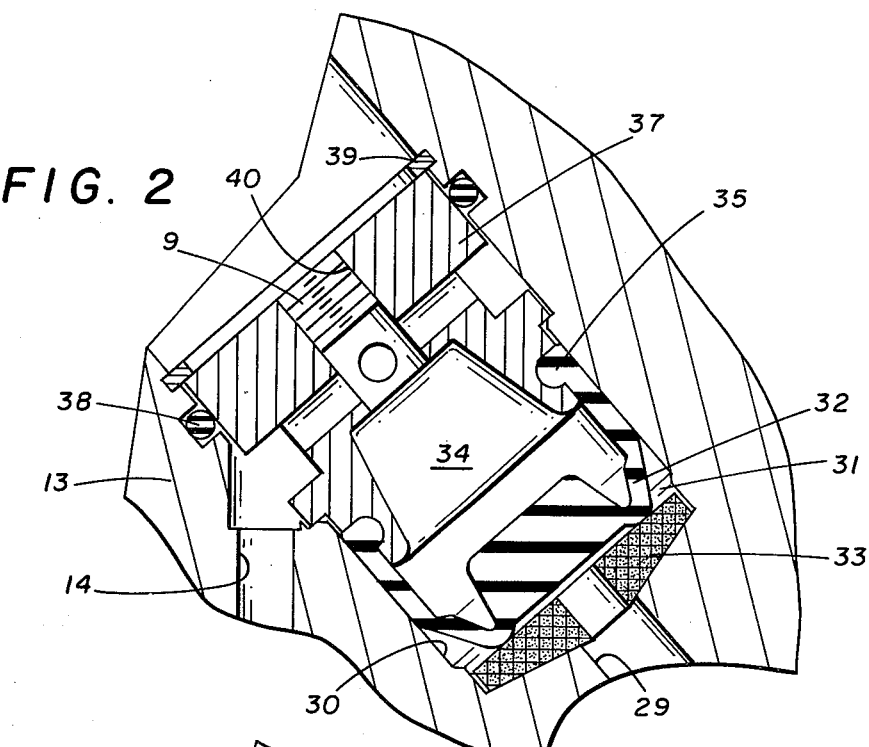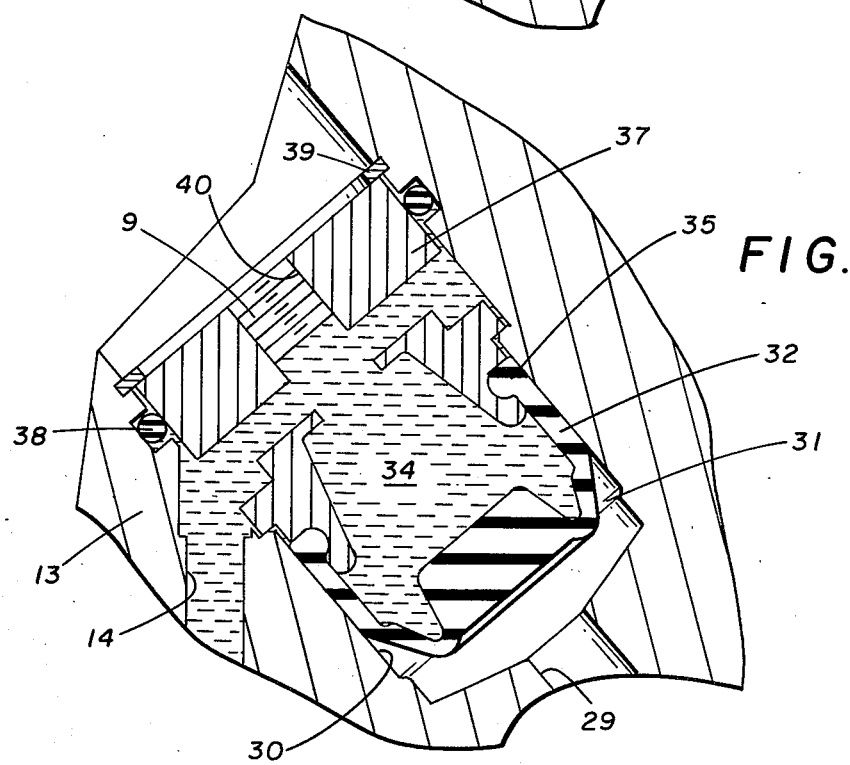

ROCK BIT LUBRICATION SYSTEM UTILIZING EXPELLABLE PLUG FOR OBTAINING EXPANSION SPACE

CROSS-REFERENCE TO RELATED APPLICATION

This is a continuation-in-part of application Ser. No. 812,287 filed July 1, 1977.

BACKGROUND OF THE INVENTION

The present invention relates to the art of earth boring in general and, more particularly, to a method of constructing a rotary rock bit and a system for equalizing pressures in the lubrication system of a rotary rock bit. Problems have been encountered with prior art systems of supplying lubricant to the bearings of a rotary rock bit because of the relatively long lifetime of modern bits and the wide variation of environmental conditions encountered during the drilling operation. When a rotary rock bit is lowered into a well bore, the environmental pressure surrounding the bit increases at the rate of approximately ½ pound per square inch for each foot of depth. This means that at a depth of 10,000 feet the hydrostatic pressure on the outside of the bit could be 5,000 p.s.i. or more because of the weight of the drilling fluid in the well bore above the bit. In order for a lubrication system to function properly at the elevated downhole pressures, some means must be provided to equalize the internal pressure of the lubricant in the lubrication system with the hydrostatic pressure of the drilling fluid in the well bore. Failure to provide an effective pressure equalizing system in prior art rock bits has resulted in the destruction of one or more elements of the lubrication system. The elements of the lubrication system that have been the most susceptible to destruction in the prior art rock bits are the seal and the flexible diaphragm in the lubricant reservoir.

A wide variety of other environmental conditions also affect the performance of a pressure equalizing system. For example, the temperature will rise as the well bore penetrates deeper into the earth and temperatures in the range of 250° to 350° at 10,000 foot depth may be expected with even higher temperatures at greater depths. As the bit is rotated and the cone cutters engage the formations, a large amount of heat is generated causing the environmental temperature of the bit to rise. The elevated temperature has an adverse effect on the lubricant, the structural elements of the bit including the lubrication system, the pressure equalizing system and the bearings.

Vacillating pressure conditions, including the magnitude of vacillation, must also be considered when providing a pressure equalizing system. Periodic pressure variations are produced during the drilling operation and these pressure variations can damage the structural elements of the lubrication system and the pressure equalizing system. During drilling, joints of pipe must be added to the drill string for progressively deeper penetration. This may mean that 50 or 60 joints of pipe are added to the drill string during the normal life of a sealed bearing rotary rock bit. In order to add a joint of pipe, which is usually 30 feet in length, rotation of the bit must be stopped and the entire string of pipe, including the bit, must be raised high enough to allow the kelly to clear the rotary table (35–50 feet). Since operating costs of an oil well drilling rig are quite high, the time that the bit is off bottom and not drilling must be kept to a minimum. Therefore, the addition of a joint of pipe must be accomplished quickly and the drill string must be raised and lowered as rapidly as possible. This raising and lowering of the drill string creates pressure variations that affect the lubrication system and the pressure equalizing system.

When the bit is on bottom, the pressure of lubricant is the same as, or nearly the same as, the hydrostatic pressure of fluid in the well bore. However, as the drill string is elevated in the well bore, the bit body acts in much the same manner as a piston in a cylinder. The enlarged diameter of the bit body exerts a force on the column of fluid above it due to the velocity of the bit traveling up the well bore. The velocity of the fluid moving past the large diameter portion of the bit may be fairly high causing a low pressure area in the zone between the cutters and the main bit body where the seal is located. The pressure differential between the pressure of fluid in the area of the seal and the pressure of the lubricant inside of the bit may be in the order of 100 p.s.i. or more during periods of high acceleration of the drill string.

In a substantial number of sealed bearing rotary rock bits, seals are used that resist flow in both directions. An example of this type of seal is an O-ring seal. Bits using this type of seal may encounter a substantial pressure build-up within the lubrication system. Some of the potential sources of the pressure build-up are the pressure differential between lubricant inside of the bit and the fluid in the well bore outside of the bit and thermal expansion of the lubricant caused by the elevated temperatures encountered during the drilling operation.

DESCRIPTION OF PRIOR ART

Many different systems have been employed (or described in printed publications) to compensate for pressure variations acting on the lubricant within the lubrication system of a rotary rock bit. A movable piston has been shown as being positioned in the lubricant reservoir and the area above the piston vented to the exterior of the bit to expose the upper side of the piston to the environmental pressure of the well bore. A check relief valve has been provided to operate at low pressures to permit flow out of the lubricant reservoir to the outside of the bit but block any flow in the reverse direction. A lubricant reservoir has been described as having a permanent closure plug removably mounted within the entrance to the reservoir and a temporary closure plug removably mounted within the entrance to the reservoir in place of the permanent plug when the reservoir is filled with lubricant whereby when so filled and the permanent plug mounted in place of the temporary plug, an expansion space is provided between the lubricant in the reservoir and the inner side of the permanent plug. A free breathing porous filter plug has been positioned in a passageway for equalizing the internal pressure of lubricant in the lubricant reservoir and the hydrostatic pressure of drilling fluid in the well bore. Pressure compensation or equalization of pressure across a seal separating the lubricant inside the bit from the drilling mud on the exterior of the bit has been described as being obtained by providing sufficient displacement of the seal to accommodate changes in lubricant volume caused by temperature and pressure changes encountered in drilling.

SUMMARY OF THE INVENTION

The present invention provides a rock bit lubrication system with an expansion space provided within the lubrication system to accommodate increases in volume within the lubrication system during drilling. A flexible diaphragm is located in a lubricant reservoir cavity in the bit. The flexible diaphragm divides the cavity into a lubricant portion and an expansion portion. A plug of expellable material is positioned in the expansion portion of the lubricant reservoir. The lubricant portion of the lubricant reservoir is filled with lubricant. The plug prevents the lubricant from entering the expansion portion. The plug is expelled from the expansion portion of the lubricant reservoir. This provides an expansion space in the bit to accommodate any increase in volume in the lubrication system during drilling. The above and other features and advantages will become apparent from a consideration of the following detailed description of the invention when taken in conjunction with the accompanying drawings.

BRIEF DESCRIPTION OF THE DRAWINGS

FIG. 2 is an enlarged view of the lubricant reservoir shown in FIG. 1.

FIG. 3 is the view of FIG. 2 illustrating the expansion portion of the lubricant reservoir.

DETAILED DESCRIPTION OF THE INVENTION

Figure 1:
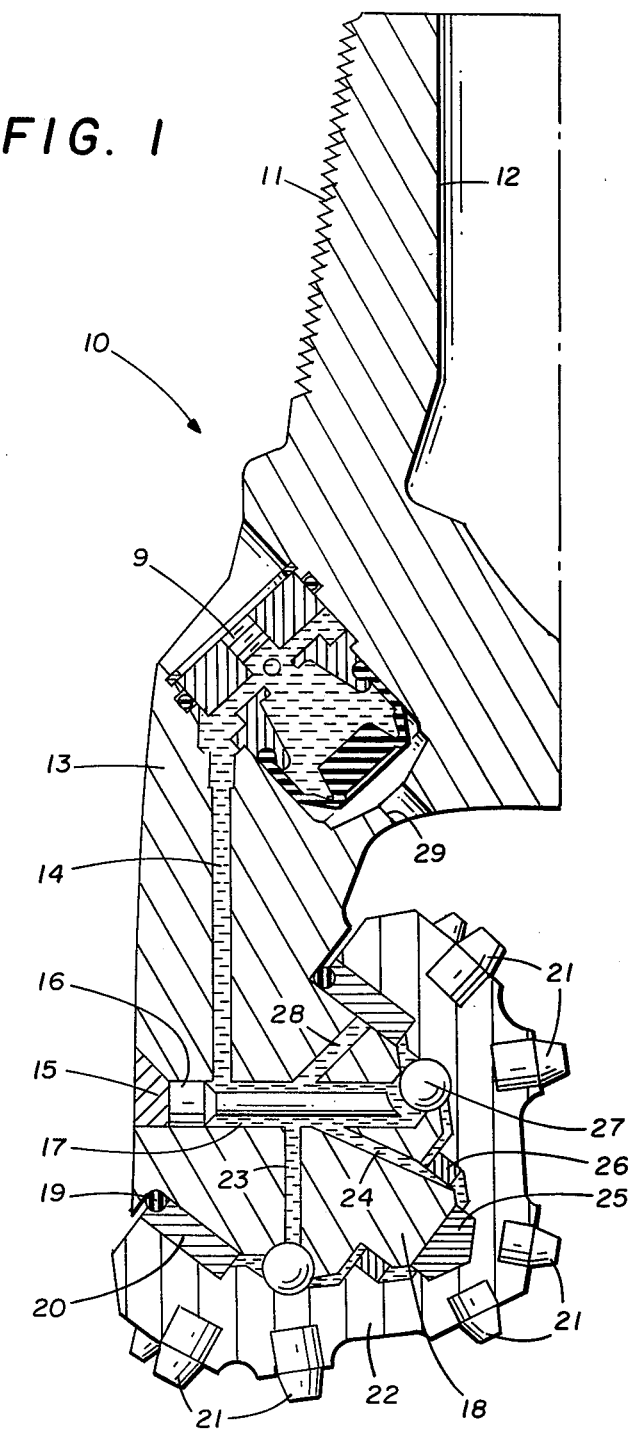
FIG. 1 illustrates a sectional view of one arm of a rotary rock bit showing the lubrication system.

Referring now to the drawings, and to FIG. 1 in particular, illustrated therein and generally designated by the reference number 10 is a three cone sealed bearing rotary rock bit with one arm of the bit 10 being shown in FIG. 1. As illustrated, the bit 10 includes a bit body including an upper threaded portion 11. The threaded portion 11 allows the bit 10 to be connected to the lower end of a rotary drill string (not shown). Depending from the bit body 11 are three substantially identical arms with the arm 13 being shown in FIG. 1. The lower end of each of the arms is provided with an extended journal portion and the details of this journal portion will be discussed subsequently. Three rotary cone cutters, cutter 22 being shown in FIG. 1, are rotatably positioned on the three bearing pins extending from the arms. Each of the cutters includes cutting structure on its outer surface adapted to disintegrate the formations as the bit 10 is rotated and moved downward. The cutting structure 21 is shown in the form of tungsten carbide inserts. However, it is to be understood that other cutting structures such as steel teeth may be used as the cutting structure on the cone cutters.

The cutter 22 is rotatably positioned on the journal portion of the arm 13 and adapted to disintegrate earth formations as the bit is rotated. The cutting structure 21 on the outer surface of cutter 22 contacts and disintegrates the formations in a manner that is well known in the art. The journal portion of arm 13 consists of a bearing pin 18 upon which the cutter 22 is mounted. A plurality of bearing systems are located in the bearing area between the cutter 22 and the bearing pin 18. The bearing systems in the bearing area include an outer friction bearing 20, a series of ball bearings 27, an inner friction bearing 26 and a thrust button 25. An O-ring seal 19 is positioned between the cutter 22 and the bearing pin 18. This seal retains lubricant in the bearing area around the bearing systems and prevents any materials in the well bore from entering the bearings. A passageway 17 is provided to allow lubricant to be transmitted to the bearing systems. The passageway 17, as shown, also allows the balls that make up the ball bearing system 27 to be inserted into position after the cone cutter 22 is placed on the bearing pin 18. The series of ball bearings 27 serve to lock the cone cutter 22 on bearing pin 18. After the balls are in place, a plug 16 is inserted into the passageway 17 and welded therein by weld 15. Plug 16 has a reduced diameter throughout the major portion of its length to allow lubricant to be transmitted to the bearing area. Additional passageways 23, 24 and 28 extend from passageway 17 to the bearing area to insure a sufficient supply of lubricant to bearings 20, 27, 26 and 25.

A lubricant reservoir is located in the arm 13 to provide a supply of lubricant to the bearings. A passageway 14 connects the lubricant reservoir with the passageway 17 to allow lubricant to be transmitted from the reservoir directly to the bearings. A flexible diaphragm is positioned in the lubricant reservoir bore and encloses the lower portion of the reservoir. The area within the lubricant reservoir bore, but outside of the diaphragm, is vented to the dome of the bit by a passageway 29 that connects the lower end of the lubricant reservoir bore with the dome of the bit. The upper end of the lubricant reservoir bore is closed by a cap locked in place in the arm 13 by a snap ring. An O-ring seal is positioned around the cap to retain lubricant in the lubricant reservoir. A passageway extends through the cap to allow lubricant to be introduced into the lubricant reservoir. A plug 9 closes the passageway.

The bit 10 includes a central passageway 12 extending along the central axis of the bit 10 to allow drilling fluid to enter from the upper section of the drill string (not shown) immediately above and pass downward through three jet nozzles (not shown) past the cutting structure of the cone cutters. In use, the bit 10 is connected as the lower member of a rotary drill string (not shown) and lowered into a well bore until the cone cutters engage the bottom of the well bore. Upon engagement with the bottom of the well bore, the drill string is rotated, rotating bit 10 therewith. Drilling fluid is forced down through the interior passage of the rotary drill string and continuous through the central passageway 12 of bit 10 passing through the nozzles past the cutting structure of the cutters to the bottom of the well bore, thence, upward in the annulus between the rotary drill string and the wall of the well bore carrying with it the cuttings and debris from the drilling operation.

Referring now to FIG. 2, an enlarged view of the lubricant reservoir area of the bit 10 is shown that illustrates the structural elements of the lubricant system in greater detail. The lubricant reservoir bore 30 extends into the arm 13 of the bit 10. The lower end of the bore 30 is vented to the dome of the bit by the passageway 29. The lubricant passage 14 extends from the bore 30 to the bearing area. A flexible reservoir diaphragm 32 is positioned in the bore 30. The diaphragm is locked in place by the reservoir cap 37. A molded O-ring type seal 35, being primarily an axial seal and secondarily a radial seal, is compressed by the reservoir cap 37 to provide a positive seal between the flexible diaphragm 32 and the bore 30. An O-ring cap seal 38 is positioned between the reservoir cap 37 and the bore 30 above the passage 14 to provide a positive seal for the lubricant reservoir. The reservoir cap 37 is locked in place by snap ring 39. A threaded filler hole 40 is provided to allow the lubricant reservoir to be filled with lubricant. The threaded filler hole 40 is closed by a plug 9.

The lubricant reservoir as shown in FIG. 2 has not yet been filled with lubricant. The reservoir area 34 will receive the lubricant which will be pumped into place through threaded filler hole 40. The lubricant will be transmitted to the bearings through the lubricant passageway 14. The flexible diaphragm 32 is prevented from completely filling the bore 30 by the wax plug 33. An expansion space will be provided outside the flexible diaphragm 32. As will hereinafter be explained, it has been found that the expansion space should be not less than substantially 5% of the lubrication system's full capacity and the expansion space of the lubrication system shown in FIG. 2 is approximately 10% of the lubrication system's full capacity and the lubricant area is approximately 90% of the lubrication system's full capacity.

Referring now to both FIGS. 2 and 3, the filling of the lubricant reservoir will be described. The lubrication system is evacuated with a vacuum pump and subsequently filled with grease. While filling with grease, an expansion space is left at the bottom of the reservoir bore. The volume of this space is controlled carefully. The wax plug 33 is molded into the shape of the bottom of the reservoir bore 30. The thickness of the wax plug 31 is controlled so that the volume it occupies is known. The plug 33 is made from Carbowax 1540 which has a melting point of 115° F. During assembly, the wax plug 33 is placed in the bottom of the reservoir bore 30. The diaphragm 32 and cap 37 are installed. When the reservoir is being filled with grease the diaphragm 32 is extended down against the plug 33. When the bit is full of grease, the greasing fixture is removed and grease allowed to bleed out until the internal grease pressure is equalized with the atmosphere. The reservoir is then closed. The bit is placed in a bucket of oil and heated to 212° F. and held there for one hour. As soon as the oil temperature rises to 115° F. the wax plug 33 melts and runs out through the dome vent hole 29. This provides the expansion space 36 as shown in FIGS. 1 and 3 to accommodate any expansion of volume within the lubricant area during the drilling operation. It was determined that if the expansion space 36 left between the bottom of the reservoir and the diaphragm is not less than substantially 5%, it will prevent any excessive internal lubricant pressures from forming. It is to be understood that any expellable material may be used for the plug 33. For example, the plug could be made of ice or other meltable material or a dissolveable material such as salt or other material. It is also to be understood that rather than placing the bit in a bucket of oil and heating it, the wax plug could be left in the bit and then placed in the borehole. When the high borehole temperatures are encountered during the drilling operation, the wax plug will melt and be expelled from the expansion portion of the lubricant reservoir.

Tests were conducted to determine the preferred size of the expansion space 36. As a result of the tests, it was determined that the expansion space 36 should be not less than substantially 5% of the lubrication system's full capacity. Analysis of the tests indicated that the preferred embodiment should have the expansion space 36 take up approximately 10% of the lubrication system's full capacity and the area containing lubricant should take up approximately 90% of the lubrication system's full capacity. The tests were conducted in the manner described below.

TESTS

A dull 7⅞ S86F was obtained for use in the test. The bit was cleaned and the old grease in it was flushed out. New diaphragms which were assembled without any type of valve were installed in the bit along with new reservoir caps, O-rings, snap rings and filler plugs. The bit was evacuated with a vacuum pump and filled with fresh grease. While filling with grease, an expansion space was left at the bottom of the reservoir bore. The volume of this space was controlled very carefully. Wax plugs were molded to the shape of the bottom of the reservoir bore. The thickness of these plugs was controlled so that the volume they occupied was known. These plugs were made from Carbowax 1540 which has a melting point of 115° F.

During assembly, the wax plug was placed in the bottom of the reservoir bore. Then the diaphragm and cap were installed. When filling with grease the diaphragm was extended down against the plug. When the bit was full of grease, the greasing fixture was removed from the filler hole and grease was allowed to bleed out until the internal grease pressure equalized with the atmosphere. The system was then closed. The bit was placed in a bucket of oil at room temperature, then heated to 212° F. and held there for one hour. As soon as the oil temperature rose to 115° F. the wax plugs would melt and run out through the dome vent hole, thus leaving an expansion space for the diaphragm. After 1 hour at 212° F. the bit and oil were heated to 250° F. and held there for one hour. Then it was heated to 300° F. and held there for an additional hour. All during these heating periods the internal pressure was monitored with pressure gages attached to reservoir caps. Several tests were run as described above with different sizes of the wax plugs to determine how much expansion space was needed to reliably insure that no internal pressure would build up in the lubricant. It was determined that if the lubrication system is filled to not less than substantially 5% of its full capacity, the expansion space left between the bottom of the reservoir bore and the diaphragm will be sufficient to prevent any excessive internal lubricant pressures from forming.

The embodiments of the invention in which an exclusive property or privilege is claimed are defined as follows:

1. A method of constructing a lubrication system for a rotary rock bit, comprising the steps of:
   providing a lubricant reservoir cavity in said rotary rock bit;
   positioning a flexible diaphragm in said lubricant reservoir cavity so that the flexible diaphragm divides the cavity into a lubricant portion and an expansion portion;
   positioning a low melting point plug in said expansion portion;
   filling said lubricant portion of said lubricant reservoir cavity with a lubricant; and
   raising the temperature of said low melting point plug causing said plug to melt and run out of said expansion portion of said lubricant reservoir.

2. A method of constructing a lubrication system for a rotary rock bit, comprising the steps of:
   providing a lubricant reservoir in said bit;
   positioning a low melting point plug in said lubricant reservoir;

positioning a flexible diaphragm in said lubricant reservoir;
filling said lubricant reservoir with a lubricant; and
raising the temperature of said low melting point plug causing said plug to melt and run out of said lubricant reservoir thereby leaving an expansion space in said lubricant reservoir.

3. A method of constructing a lubrication system for a rotary rock bit, comprising the steps of:
providing a lubricant reservoir bore in said bit said bore having an upper end and lower end;
providing a cap to close said upper end of said lubricant reservoir bore;
positioning a flexible and resilient diaphragm in said lubricant reservoir bore so that the flexible diaphragm divides the bore into a lubricant portion and an expansion portion;
positioning a low melting point plug in said expansion portion;
filling said lubricant portion of said lubricant reservoir bore with a lubricant; and
raising the temperature of said low melting point plug causing said plug to melt and run out of said lower end of said lubricant reservoir bore thereby leaving said expansion portion in said lubricant reservoir bore.

4. The method of claim 3 wherein said expansion portion is approximately 10% of the volume of said lubrication system.

* * * * *